(12) United States Patent  (10) Patent No.: US 7,643,751 B2
Sone et al.  (45) Date of Patent: Jan. 5, 2010

(54) NETWORK MANAGING APPARATUS, OPTICAL ADD/DROP MULTIPLEXER, AND NETWORK MANAGING METHOD

(75) Inventors: Kyosuke Sone, Kawasaki (JP); Yutaka Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 11/826,889

(22) Filed: Jul. 19, 2007

(65) Prior Publication Data
US 2007/0264011 A1    Nov. 15, 2007

Related U.S. Application Data

(63) Continuation of application No. PCT/JP2005/000931, filed on Jan. 25, 2005.

(51) Int. Cl.
 *G02F 1/00* (2006.01)
(52) U.S. Cl. .................................. 398/5; 398/4; 398/7
(58) Field of Classification Search ..................... 398/5, 398/4, 3, 7, 2, 59
See application file for complete search history.

(56) References Cited

U.S. PATENT DOCUMENTS 6,643,041 B1  11/2003  Ikeda et al.

2002/0118414 A1 *  8/2002  Yuki et al. ................... 359/119
2004/0184809 A1    9/2004  Miyata et al.

FOREIGN PATENT DOCUMENTS

JP   2001-156821 A   6/2001
JP   2001-217754 A   8/2001

OTHER PUBLICATIONS

International Search Report PCT/JP2005/000931, dated Apr. 26, 2005.
Partial Translation of the Written Opinion; PCT/: PCT/ISA, dated Apr. 26, 2005.

* cited by examiner

*Primary Examiner*—M. R. Sedighian
(74) *Attorney, Agent, or Firm*—Staas & Halsey LLP

(57) ABSTRACT

A network managing apparatus is connected to one of multiple OADM nodes that execute optical communication on an optical ring network configured by a two-line transmission path including of an active line and a backup line. The apparatus includes a storing unit that stores arrangement information of the OADM nodes and operating wavelength information of optical signals transmitted by the nodes. A controlling unit updates the operating wavelength information retained in the storing unit based on fault information from the OADM nodes and distributes the updated operating wavelength information to the OADM nodes.

6 Claims, 12 Drawing Sheets

FIG.3

| | | Node 1 | | | | Node 2 | | | | Node 3 | | | | Node 4 | | | |
|---|---|---|---|---|---|---|---|---|---|---|---|---|---|---|---|---|---|
| ACTIVE LINE | WAVELENGTH NUMBER | 1 | 2 | 3 | 4 | 1 | 2 | 3 | 4 | 1 | 2 | 3 | 4 | 1 | 2 | 3 | 4 |
| ACTIVE LINE | OPERATING INFORMATION | 0/1 | 0/1 | 0/1 | 0/1 | 0/1 | 0/1 | 0/1 | 0/1 | 0/1 | 0/1 | 0/1 | 0/1 | 0/1 | 0/1 | 0/1 | 0/1 |
| BACKUP LINE | WAVELENGTH NUMBER | 1 | 2 | 3 | 4 | 1 | 2 | 3 | 4 | 1 | 2 | 3 | 4 | 1 | 2 | 3 | 4 |
| BACKUP LINE | OPERATING INFORMATION | 0/1 | 0/1 | 0/1 | 0/1 | 0/1 | 0/1 | 0/1 | 0/1 | 0/1 | 0/1 | 0/1 | 0/1 | 0/1 | 0/1 | 0/1 | 0/1 |

301 (Active, Node 1, wavelength 4) · 302 (Backup, Node 3, wavelength 2)

FIG.6

| | Node 1 | Node 2 | Node 3 | Node 4 |
|---|---|---|---|---|
| ACTIVE LINE | ∥∥∥∥ $\lambda1\ \lambda2\ \lambda3\ \lambda4$ | ∥∥∥∥ | ∥∥∥∥ | ∥∥∥∥ |
| BACKUP LINE | ∥∥∥∥ | ∥∥∥∥ | ∥∥∥∥ | ∥∥∥∥ |

NETWORK MANAGING APPARATUS, OPTICAL ADD/DROP MULTIPLEXER, AND NETWORK MANAGING METHOD

CROSS-REFERENCE TO RELATED APPLICATIONS

This is a continuation application of International Application Number PCT/JP2005/000931, which was filed on Jan. 25, 2005.

BACKGROUND OF THE INVENTION

1. Field of the Invention

The present invention relates to optical ring network management, including a method, apparatus, and optical add drop multiplexing node thereof.

2. Description of the Related Art

Recently, with the explosively expanding demand for data communication indicated by the Internet traffic, increases in the capacity of each network are desired. In addition, networks are desired to be highly flexible and economical because the services provided therethrough are getting more diversified. Especially, networks employing optical transmission (hereinafter, "optical network") are the core for forming the basis of information communication networks and the development thereof is rapidly progressing because faster speeds and a wider areas for providing services are further desired.

For optical networks, the WDM technique of simultaneously transmitting multiple signals using one optical fiber by multiplexing light beams having different wavelengths is widely used. At a node that executes transmission using wavelength division multiplexing (WDM), a multiplexed optical signal (hereinafter, "WDM signal") is processed for each wavelength. Therefore, the WDM signal is controlled by an optical add drop multiplexer (OADM) that executes adding and dropping of an optical signal having a specific wavelength without converting the WDM signal into an electric signal. An approach to realize the function of the OADM can include a method of using a wavelength-tunable filter that selects and transmits therethrough an optical signal having a desired wavelength from a WDM signal (see, for example, Japanese Patent Application Laid-Open Publication No. 2004-235741).

Conventionally, a form that is often employed in a metropolitan network of various forms for optical networks is an optical ring network as shown in FIG. 9. FIG. 9 depicts an optical ring network employing WDM. An optical ring network B includes a ring line 10 and four OADM nodes 9 (Node 1 to Node 4) that are installed on the ring line 10, each having an OADM function. FIG. 10 depicts an OADM node disposed on the optical network. The OADM node 9 includes an optical coupler 11 of one by two (having one input and two outputs) into which a WDM signal is input, a wavelength tunable filter unit 12 connected to an end of the optical coupler 11, and a rejection adding filter 13 connected to the other end of the optical coupler 11.

The wavelength tunable filter unit 12 can drop an optical signal having an arbitrary wavelength of the WDM signal alone by using an acousto-optic tunable filter (AOTF). The configuration of the wavelength tunable filter unit 12 differs depending on the device employed therein as a wavelength tunable filter. However, when an AOTF is used, the unit 12 is configured by an AOTF, an RF signal unit, a control unit, etc., due to the AOTF characteristic of being able to transmit an optical signal having an arbitrary wavelength by the variation of a radio frequency (RF) applied thereto as a control signal.

The input side of the rejection adding filter 13 is connected to the optical coupler 11 and a line 14 that inputs a specific wavelength λ1 from the outside. The output side of the rejection adding filter 13 is connected to the ring line 10. The rejection adding filter 13 adds the optical signal having the specific wavelength from the line 14. The optical signal is coupled with another optical signal input from the optical coupler 11 and, thereby, becomes a WDM signal, and is output to the ring line 10. The reject function is a function to, when an added optical signal travels round once in the optical ring network B and returns to the OADM node 9 where the optical signal is added, e.g., from Node 1 to Node 1, terminate only the optical signal having the specific wavelength λ1 in the WDM signal input from the optical coupler 11 to prevent the optical signal from being multiplexed with other optical signals having the same wavelength added from the line 14. The wavelength of an optical signal to be added is assigned in advance to each node and the selection of a wavelength to be received at the wavelength tunable filter unit 12 is the setting of a communication counterpart. Since a wavelength to be received can arbitrarily set at the wavelength tunable filter unit 12, communication between arbitrary nodes is enabled.

Based on the configuration of the optical ring network B, another optical ring network has also been proposed that includes two optical fibers as a measure in the case of a malfunction in the network such as a disconnection of an optical fiber. FIG. 11 depicts an optical ring network using two optical fibers. FIG. 12 depicts a table of multiplexed states of the WDM signal at each node in the network depicted in FIG. 11. An optical ring network C is configured by an active line 20, a backup line 30 for the active line 20, and four OADM nodes 19 (Node 1 to Node 4). As depicted in FIG. 12, the same WDM signal is transmitted to any of the OADM nodes 19 (Node 1 to Node 4) on the active line 20 and the backup line 30 and, therefore, even when the active line 20 is disconnected, an instant recovery of the communication is enabled by executing protection of the active line 20 using an optical unidirectional path switched ring (O-UPSR) that instantly switches the connection at a node to the backup line 30 (see, for example, Japanese Patent Application Laid-Open Publication No. 2001-156821).

Though instant recovery is possible even when the two optical fibers are simultaneously disconnected, no setting can be made for a new wavelength path in the conventional network. FIG. 13 depicts an example of simultaneous disconnections of optical fibers of an existing line and a backup line in an optical ring network that uses two optical fibers. FIG. 14 depicts a table of multiplexed states of the WDM signal at Node 1 to Node 4 in the network configuration depicted in FIG. 13.

On the active line 20, at the time to execute dropping, the WDM signal can not reach the OADM node 19 (Node 1) immediately after a disconnected point 40 on the optical fibers and because an optical signal having a specific wavelength λ1 is added at Node 1, a WDM signal multiplexed with only the optical signal having the wavelength λ1 is transmitted to Node 2 at the time to execute the dropping. Similarly, an optical signal having a wavelength λ2 is added at Node 2, an optical signal having a wavelength λ3 is added at Node 3, and an optical signal having a wavelength λ4 is added at Node 4. Therefore, the number of signals that are multiplexed on the WDM signal is the lowest at a point immediately after the disconnected point 40, and the number of signals that are multiplexed on the WDM signal increases in the direction of the transmission on the active line 20 at each of the OADM nodes 19. Therefore, the number of signals that are multiplexed on the WDM signal is largest at Node 4 immediately before the disconnected point 40.

On the backup line 30, the WDM signal does not reach Node 4, which is positioned immediately after the disconnected point 40 in the transmitting direction of the backup line 30. Similar to the above multiplexed state of the WDM signal at each of the OADM nodes 19 on the active line 20, the number of signals that are multiplexed on the WDM signal increases at each of the OADM nodes 19 in the transmitting direction in the order of Node 4→Node 3→Node 2→Node 1.

As described above, it is impossible for the optical signal λ4 added at Node 4 to be transmitted to Node 1 on the active line 20 and for the optical signal λ1 added at Node 1 to be transmitted to Node 3 on the backup line 30. The selection of a transmission line is limited to either the active line 20 or the backup line 30 and depending on the position of the disconnected point 40, the multiplexed states of the WDM signal to be transmitted varies depending on whether the active line or the backup line is selected. Therefore, no setting for a new wavelength path can be made.

To set a new wavelength path when the two optical fibers are disconnected simultaneously, the disconnected positions of the optical fibers must be known and the OADM nodes between which communication is possible must be judged, and thereafter, the optical signal wavelength to be added that has been defined at each of the OADM nodes must be reset. To do this, operating wavelength information recorded at each of the OADM nodes must be updated. Updating of the operating wavelength information can be realized by adding an optical spectrum monitor to each of the OADM nodes. However, optical spectrum monitors are generally expensive making the addition of an optical spectrum monitor to each of the OADM nodes impractical.

SUMMARY OF THE INVENTION

It is an object of the present invention to at least solve the above problems in the conventional technologies.

A network managing apparatus according to one aspect of the present invention is connected to one of a plurality of nodes that execute optical communication on an optical ring network configured with two transmission paths including an active line and a backup line, and includes a storing unit that stores arrangement information of the nodes and operating wavelength information of optical signals transmitted by the nodes; and a controlling unit that updates, based on fault information received from the nodes, the operating wavelength information and distributes the updated operating wavelength information to the nodes.

A node according to another aspect of the present invention is on an optical ring network in which a data signal and a monitoring signal are transmitted on two paths including an active line and a backup line. The node includes an add-drop unit that drops a first optical signal having an arbitrary wavelength from the data signal and adds a second optical signal having a specific wavelength as the data signal; a detecting unit that respectively detects disconnection of both the active line and the backup line; and a notifying unit that, by a monitoring signal, notifies a network managing apparatus managing the optical ring network, of the detected disconnections.

A network managing method according to still another aspect of the present invention is a method of managing an optical ring network configured by two optical transmission paths including an active line and a backup line, and includes receiving fault information from a plurality of nodes on the optical ring network; updating, based on the received fault information, arrangement information of the nodes and operating wavelength information of optical signals being transmitted by the nodes; and distributing the updated operating wavelength information to the nodes.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a chart of an operating wavelength table retained in the network managing apparatus;

FIG. 6 depicts an operating wavelength table when two optical fibers are disconnected simultaneously;

DETAILED DESCRIPTION OF THE PREFERRED EMBODIMENTS

Referring to the accompanying drawings, exemplary embodiments according to the present invention are explained in detail below.

Figure 1:
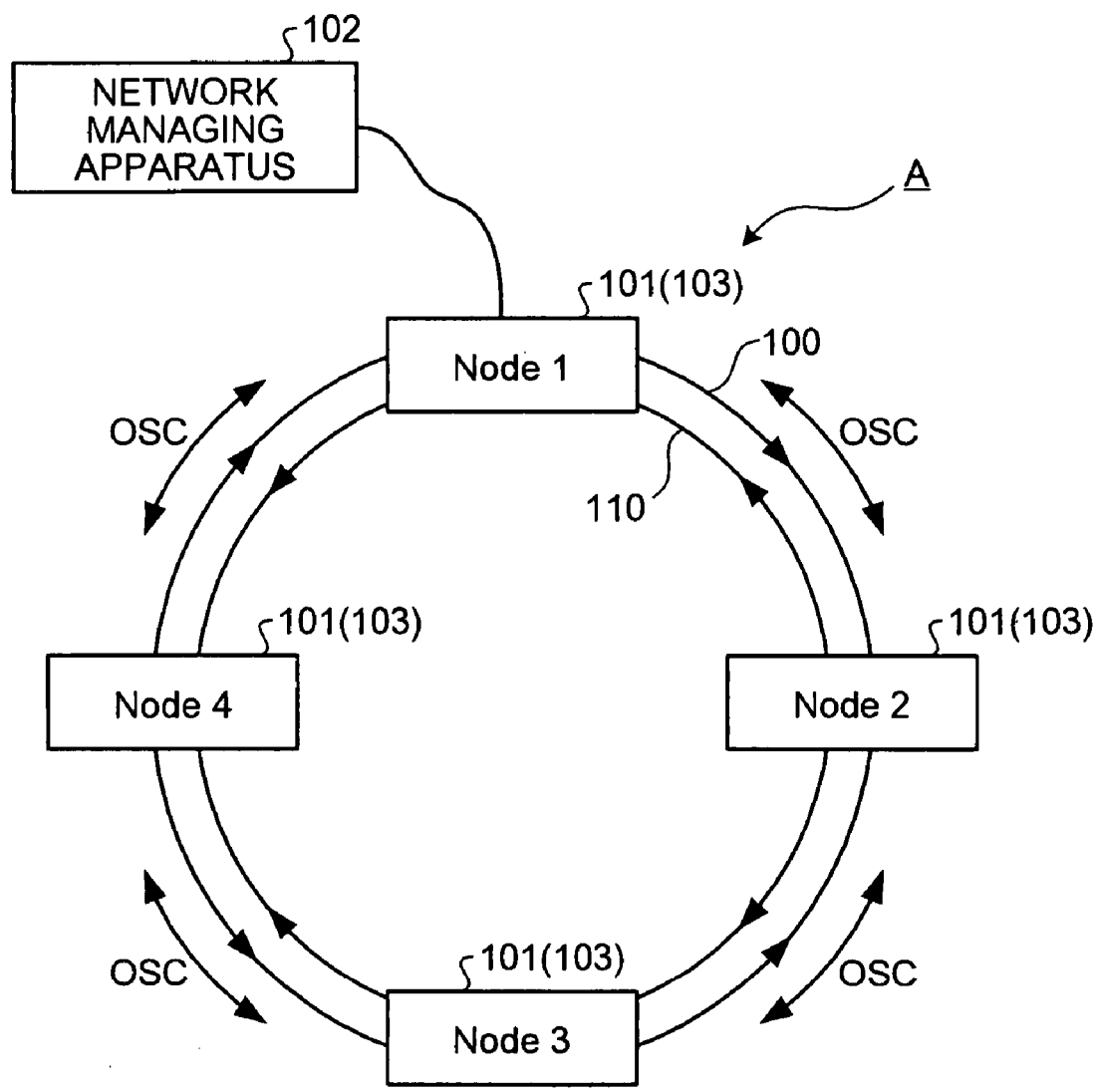
FIG. 1 depicts an optical ring network related to the present invention.

FIG. 1 depicts an optical ring network according to the present invention. An optical ring network A is configured by an active line 100 and a backup line 110, two optical fibers that transmit optical signals respectively in opposite directions; four OADM nodes 101 that are on the two optical fibers and each having an OADM function; and a network managing apparatus 102 using an NMS. The network managing apparatus 102 is connected to any one of the four OADM nodes 101. In the example depicted in FIG. 1, the apparatus 102 is connected to Node 1 of the OADM nodes 101. An OADM node 103 according to a second embodiment is also depicted in the figure and will be described later.

Optical signals being transmitted on the active line 100 and the backup line 110 are WDM signals, i.e., communication signals, to execute optical communication among the OADM nodes 101, and optical signals, i.e., network monitoring signals, on an optical supervisory channel (OSC) to monitor the state of each line in the ring-type network A. Usually, the WDM signal uses light having a wavelength in a 1.5 micrometer (μm) band and the optical signal on the OSC uses light having a wavelength in a 1.3 μm band. Therefore, these two signals are transmitted on the same line in a state where, being incompatible with each other, the signals are each independent of each other. Generally, when the optical fiber of the active line 100 is disconnected, fault information (an alarm) is communicated to each of the OADM node using the OSC and recovery of the line is executed by the O-UPSR. According to the first embodiment, the network managing apparatus 102, newly provided, centrally manages the state of the optical signal through the OSC (hereinafter, "OSC link").

Figure 2:
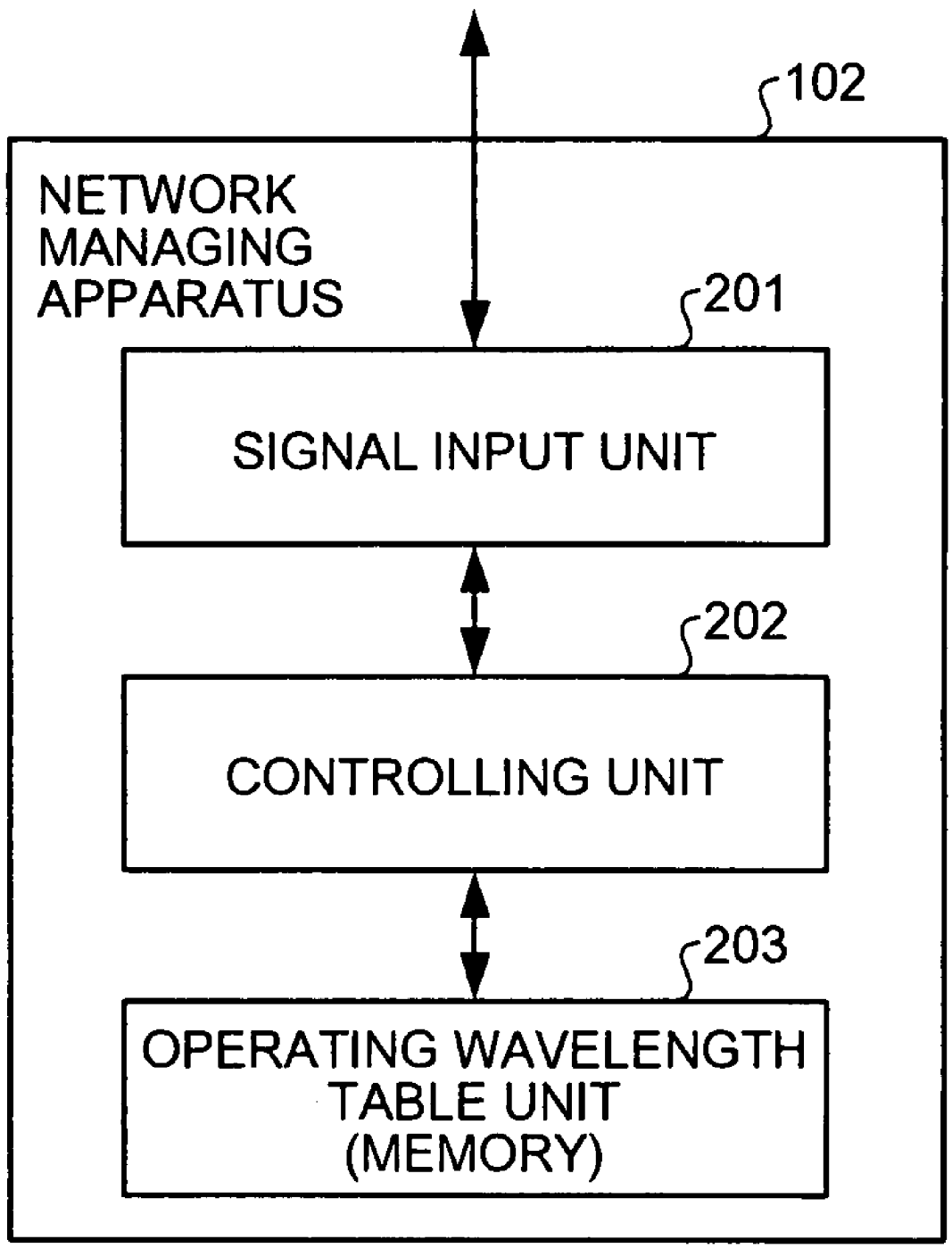
FIG. 2 is a block diagram of a network management system (NMS) of a network managing apparatus.

FIG. 2 is a block diagram of the network managing apparatus. FIG. 3 depicts an operating wavelength table retained in the network managing apparatus. The operating wavelength table collectively lists operating wavelength information for each of the OADM nodes 101. To realize the NMS function, the network managing apparatus 102 is configured by a signal input/output unit 201, a controlling unit 202, and an operating wavelength table unit (a memory) 203.

The signal input/output unit 201 and the OADM node 101 (Node 1) are directly connected, transmit signals to each other. The network managing apparatus 102 is input with the operating wavelength information from each of the OADM node 101 via the signal input/output unit 201 through the OSC and the information is retained in the operating wavelength table unit 203 as the operating wavelength table as depicted in FIG. 3. The operating wavelength table unit 203 also retains arrangement information for the OADM nodes that are connected in the optical ring network A. The controlling unit 202 detects a disconnection of the optical fiber by an alarm from the OADM node 101 input from the signal input/output unit 201 and identifies the position of the disconnection from the arrangement information of the OADM nodes 101 in the operating wavelength table unit 203 and, thereby, updates the operating wavelength table. The controlling unit 202 also transmits operating wavelength information from the updated operating wavelength table in the operating wavelength table unit 203 to the OADM nodes 101 through the signal input/output unit 201.

The operating wavelength table shown in FIG. 3 shows the states of optical signals for each wavelength transmitted on the active line 100 and the backup line 110 at each of the OADM nodes 101 (Node 1 to Node 4). The wavelength numbers 1 to 4 respectively refers to the optical signals respectively having wavelengths λ1 to λ4 that are multiplexed in the WDM signal. Operating information of each wavelength number is usually indicated by "1" or "0", "1" indicating "operating" and "0" indicating "not operating". For example, the information denoted by reference character 301 shown in FIG. 3 indicates whether the optical signal having wavelength λ4 in the WDM signal transmitted on the active line 100 at the OADM node 101 (Node 1) is operating as an optical signal for communication. Similarly, the information denoted by reference character 302 indicates whether the optical signal having λ2 in the WDM signal transmitted on the backup line 110 at the OADM node 101 (Node 3) is operating as an optical signal for communication. Because the active line 100 and the backup line 110 each transmit basically the same WDM signal, the information in the operating wavelength table for the active line 100 and that for the backup line 110 are usually same for the same OADM node 101.

Figure 4:
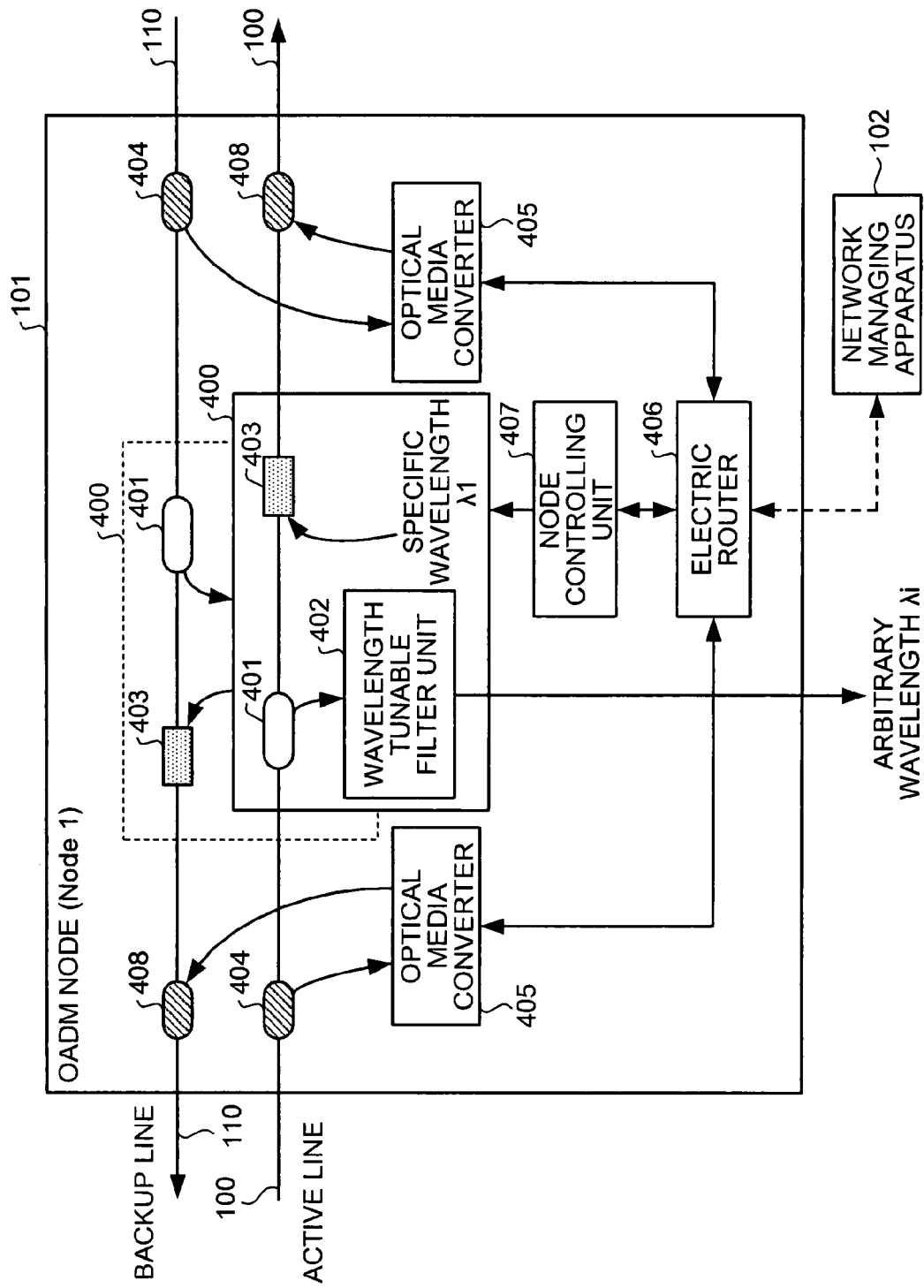
FIG. 4 depicts an OADM node according to a first embodiment.

FIG. 4 depicts the OADM node according to the first embodiment. The OADM node 101 is configured by adding a function to execute centralized management using the network managing apparatus 102 to an optical adding/dropping functioning unit 400 having a conventional OADM node such as one that includes an optical coupler 401, a wavelength tunable filter unit 402, and a rejection adding filter 403. The OADM node 101, connected to the active line 100 and the backup line 110 that respectively transmit in opposite directions, decouples an optical signal input through a respective input port for each of the lines into a WDM signal in a 1.5 μm band and an OSC link in a 1.3 μm band using a WDM coupler 404.

The decoupled WDM signal is input into the optical adding/dropping function unit 400. The optical adding/dropping function unit 400 executes communication among the OADM nodes 101 by dropping an optical signal having an arbitrary wavelength λ1 and adding a specific wavelength λ1 (in the case of Node 1). On the other hand, the OSC link decoupled by the WDM coupler 404 is converted from the optical signal into an electric signal by an optical media converter 405 and is input into an electric router 406. The electric router 406 is connected to a node controlling unit 407 included in the OADM node 101. The node controlling unit 407 reflects information of the OSC link transmitted from the active line 100 and the backup line 110 onto the optical adding/dropping function units 400 respectively of the active line 100 and the backup line 110.

In the case of the OADM node 101 connected to the network managing apparatus 102 that corresponds to Node 1 shown in FIG. 1, connection from the electric router 406 to the network managing apparatus 102 is executed. The information on the OSC link from each of the OADM node 101 is transmitted to Node 1 through the active line 100 and the backup line 110, converted into an electric signal by the optical media converter 405 in Node 1, and thereafter, is collectively transmitted from the electric router 406 to the network managing apparatus 102.

Controlling information such as updating of the operating wavelength information from the network managing apparatus 102 to each of the OADM nodes 101 is transmitted to the electric router 406 of Node 1 as an electric signal and, thereafter, is converted into an optical signal by the optical media converter 405. The information from the network managing apparatus 102 converted into the optical signal is coupled with the WDM signal transmitted from the optical adding/dropping function unit 400 by the WDM coupler 408 as the OSC link, and is output as an optical signal to the optical ring network A from respective output ports for the active line 100 and the backup line 110.

Figure 5:
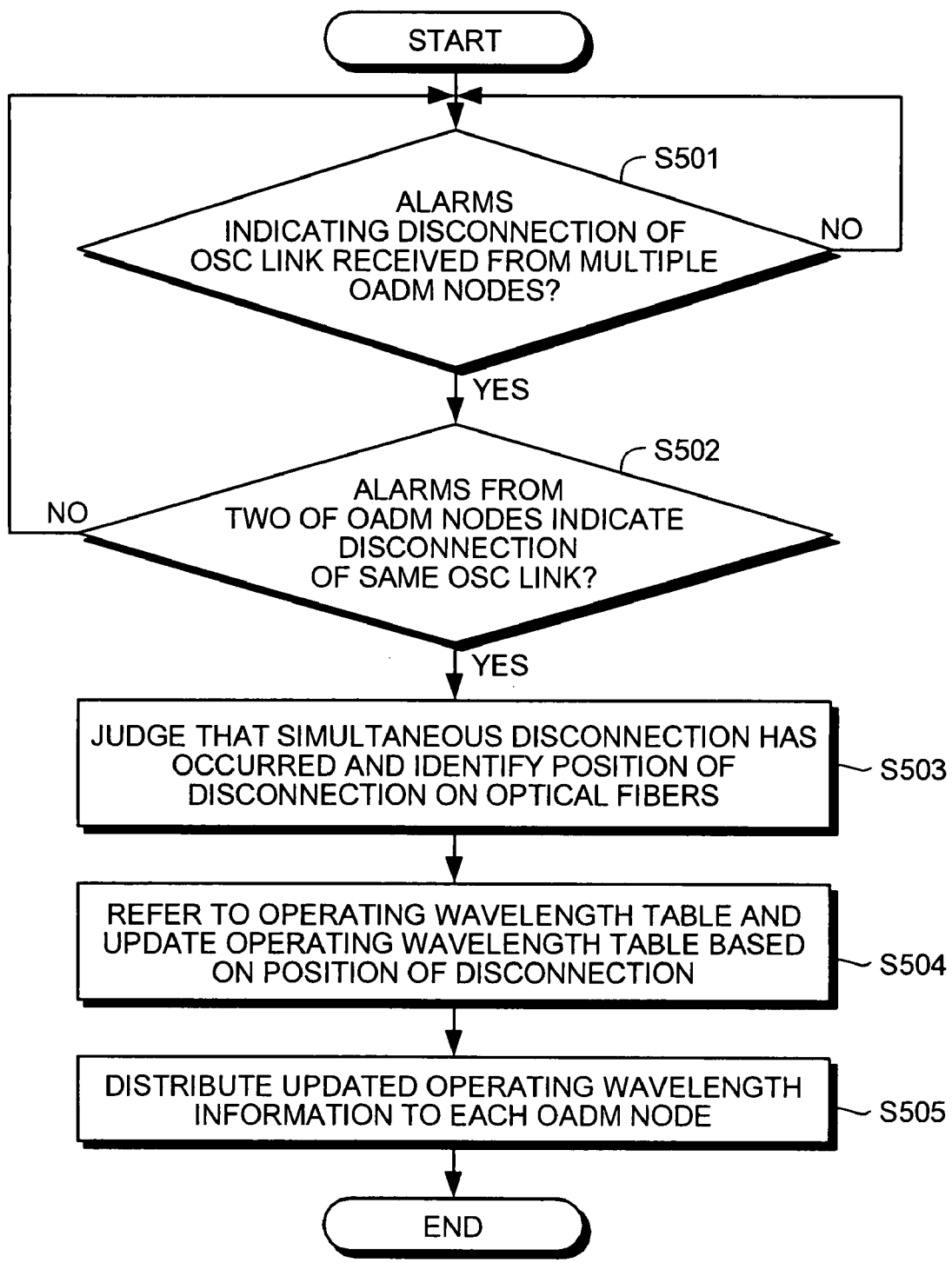
FIG. 5 is a flowchart of operations from disconnection detection to information updating according to the first embodiment.

FIG. 5 is a flowchart of operations from disconnection detection on the optical fibers to updating of the operating wavelengths according to the first embodiment.

The network managing apparatus 102 continuously manages the transmission state of the optical ring network A through the reception of OSC links from each of the OADM nodes 101. Therefore, a first step for detecting any abnormality of the optical ring network A is judging whether the controlling unit 202 (see FIG. 2) has received alarms indicating a disconnection of the OSC link from the plurality of OADM nodes 101 (step S501). If the controlling unit 202 has not received alarms from the plurality of OADM nodes 101 (step S501: NO), the controlling unit 202 judges that the two optical fibers have not disconnected simultaneously and assumes a standby state.

When the controlling unit 202 has obtained an alarm but the alarm is from one of the OADM nodes 101 indicating a disconnection of the OSC link, a disconnection of one optical fiber can be assumed. When the alarm indicates a disconnection of the active line 100, recovery of the communication is executed by using the backup line 110. Description is given herein for operations to set a new wavelength path executed when the two optical fibers are simultaneously disconnected.

As shown in the flowchart in FIG. 5, when the network managing apparatus 102 has received alarms from multiple OADM nodes 101 (step S501: YES), the network managing apparatus 102 judges whether the alarms respectively received from two of the OADM nodes 101 respectively notify the apparatus 102 of a disconnection of the same OSC link (step S502). When the disconnections are respectively of different OSC links (step S502), the procedure returns to step S501 and the apparatus 102 is in a standby state.

When the alarms from two of the OADM nodes 101 respectively notify the apparatus 102 of a disconnection of the same OSC link (step S502: YES), the network managing apparatus 102 judges that the two optical fibers connecting the two OADM nodes 101 that have issued the alarms on the OSC link have simultaneously disconnected, and identifies the disconnected positions of the optical fibers (step S503). The network managing apparatus 102 refers to the operating wavelength table (see FIG. 3) retained therein and updates the operating wavelength table based on information on the disconnected positions of the optical fibers identified at step S503 (step S504). The network managing apparatus 102 distributes the operating wavelength information from the operating wavelength table updated at step S504 to each of the OADM nodes 101 in the optical ring network A using the OSC link (step S505) and, thereby, ending the operating wavelength information updating operation.

Figure 6:
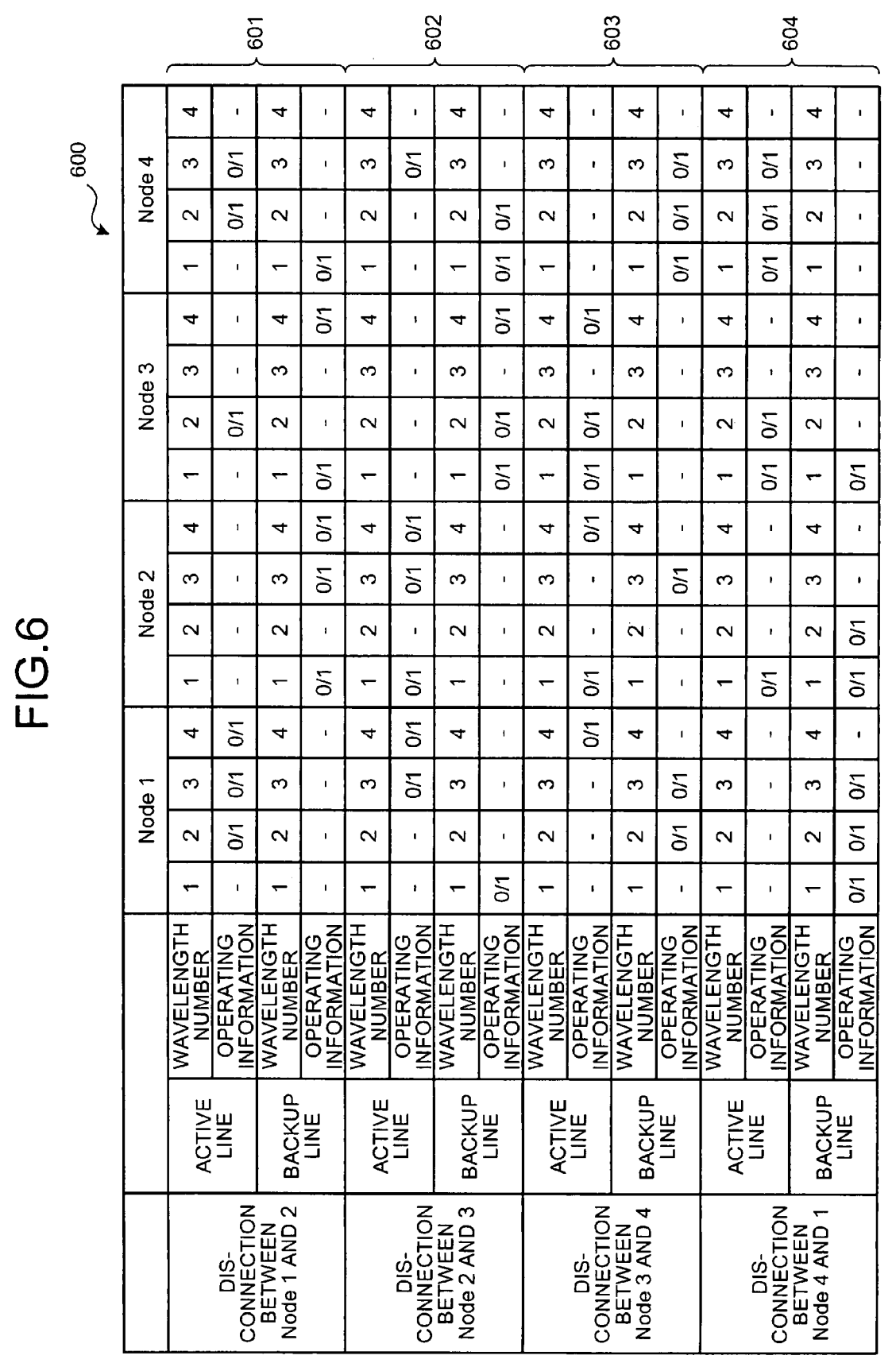

FIG. 6 depicts an operating wavelength table at the time when two optical fibers have simultaneously disconnected. As depicted, the updated data in the operating wavelength table differs depending on the disconnected position of the optical fibers. For example, when two optical fibers are disconnected between Node 1 and Node 2 of the OADM nodes 101 in the optical ring network A in FIG. 1, the contents of the updating is that as listed in a row "Disconnection between Node 1 and Node 2" 601 in the operating wavelength table 600 shown in FIG. 6. Similarly, when two optical fibers are disconnected between Node 2 and Node 3, Node 3 and Node 4, and Node 4 and Node 1, the operating wavelength table is updated respectively to those listed in the rows with "Disconnection between Node 2 and Node 3" 602, "Disconnection between Node 3 and Node 4" 603, and "Disconnection between Node 4 and Node 4" 604. The operating information in the figure is indicated by three types of indicators. In addition to "1" indicating "operating" and "0" indicating "not operating" described also for FIG. 3, "–" indicates "inoperable to due to fiber disconnection".

According to the first embodiment, as described above, the network managing apparatus 102 executes centralized management of the information on the OSC link from the OADM nodes 101 and thereby, the apparatus 102 distributes the operating wavelength information from the operating wavelength table, updated corresponding to the disconnected positions of the optical fibers, to each of the OADM nodes 101. Therefore, re-setting of specific wavelengths and transmission paths for each of the OADM nodes 101 is enabled although the two optical fibers remain disconnected.

In a second embodiment, the four OADM nodes 101 in the optical ring network depicted in FIG. 1 are replaced with the OADM nodes 103 (see FIG. 7 described hereinafter) each having a mechanism to monitor the input power of the WDM signal. The active line 100, the backup line 110, the configuration of the network managing apparatus 102, and the operating wavelength table (see FIG. 3) for the normal state retained in the network managing apparatus 102 are completely same as those in the first embodiment. Disconnection of an optical fiber is detected using a variation of a WDM signal that is monitored. When a disconnection is detected, the operating wavelength table is updated.

Figure 7:
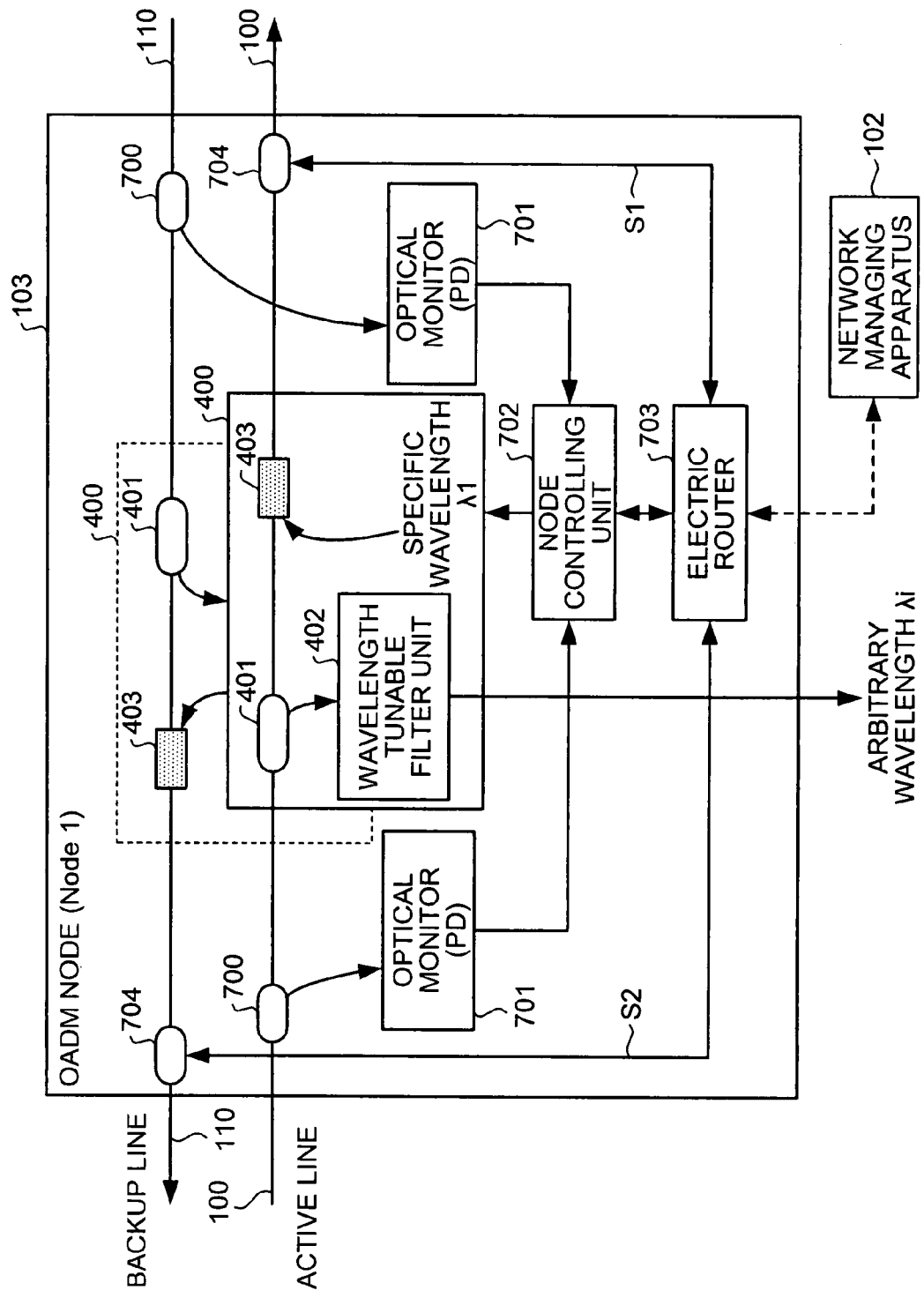
FIG. 7 depicts an OADM node according to a second embodiment.

FIG. 7 depicts the OADM node according to the second embodiment. The OADM node 103 is configured by adding a function to execute centralized management using the network managing apparatus 102 to an optical adding/dropping functioning unit 400 that includes the optical coupler 401, the wavelength tunable filter unit 402, and the rejection adding filter 403.

The OADM node 103, connected to the active line 100 and the backup line 110 that transmit respectively in opposite directions, receives the WDM signal, multiplexed with optical signals respectively having wavelengths λ1 to λ4, through input ports respectively for the active line 100 and the backup line 110. Similar to the first embodiment, the WDM signals transmitted respectively on the active line 100 and the backup line 110 are identical.

An optical coupler 700 decouples the WDM signal input into the OADM node 103 into two signals reflecting the multiplex state of the WDM signal. One of the WDM signals decoupled by the optical coupler 700 is input into the optical adding/dropping function unit 400. The optical adding/dropping function unit 400 executes communication among the OADM nodes 103 by dropping an optical signal having an arbitrary wavelength λ1 and adding a specific wavelength λ1 (for Node 1). The other WDM signal decoupled by the optical coupler 700 is input into an optical monitor 701 that has a photo diode (PD). The PD is a device that converts input light into electricity, and detects a disconnection of an optical fiber by monitoring the optical intensity of the input WDM signal.

Monitoring information of the WDM signal in the optical monitor 701 is transmitted to a node controlling unit 702. The node controlling unit 702 reflects the monitoring information from the optical monitor 701 onto the optical adding/dropping function units 400 respectively of the active line 100 and the backup line 110, and is connected to an electric router 703 to further transmit the monitoring information of the WDM signal to the network managing apparatus 102. The electric router 703 transmits the monitoring information of the WDM signal to the network managing apparatus 102. When the network managing apparatus 102 transmits thereto controlling information such as updating of the operating wavelength information, electric router 703 converts the controlling information into an optical signal and transmits the controlling information to other OADM nodes (Node 2 to Node 4) using the OSC link. When the electric router 703 transmits a signal on the active line 100, the signal passes through a line S1, is coupled with the WDM signal by the optical coupler 704, and is transmitted to each of the OADM nodes 103.

Figure 8:
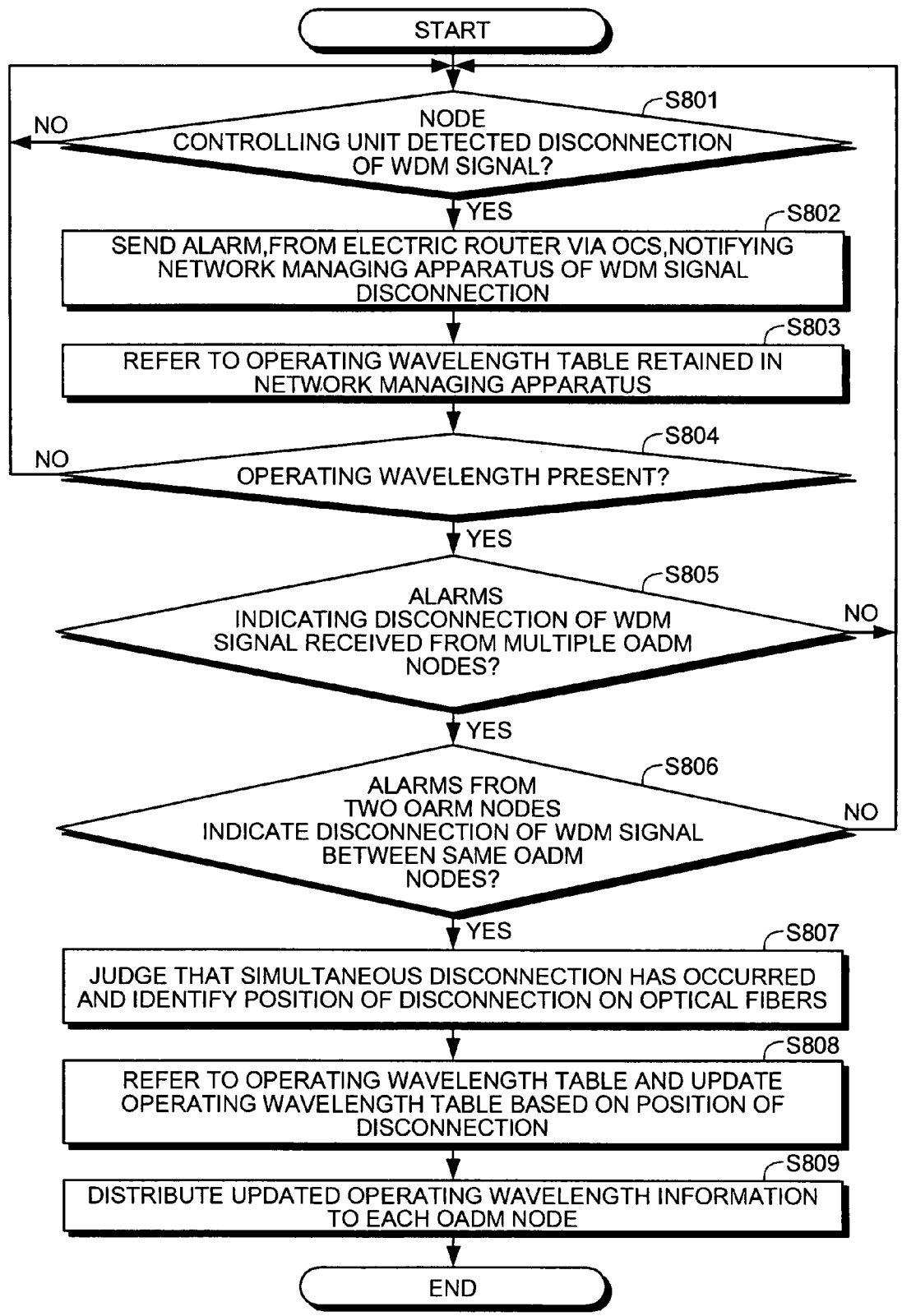
FIG. 8 is a flowchart of operations from disconnection detection to information updating according to the second embodiment.
Figure 9:
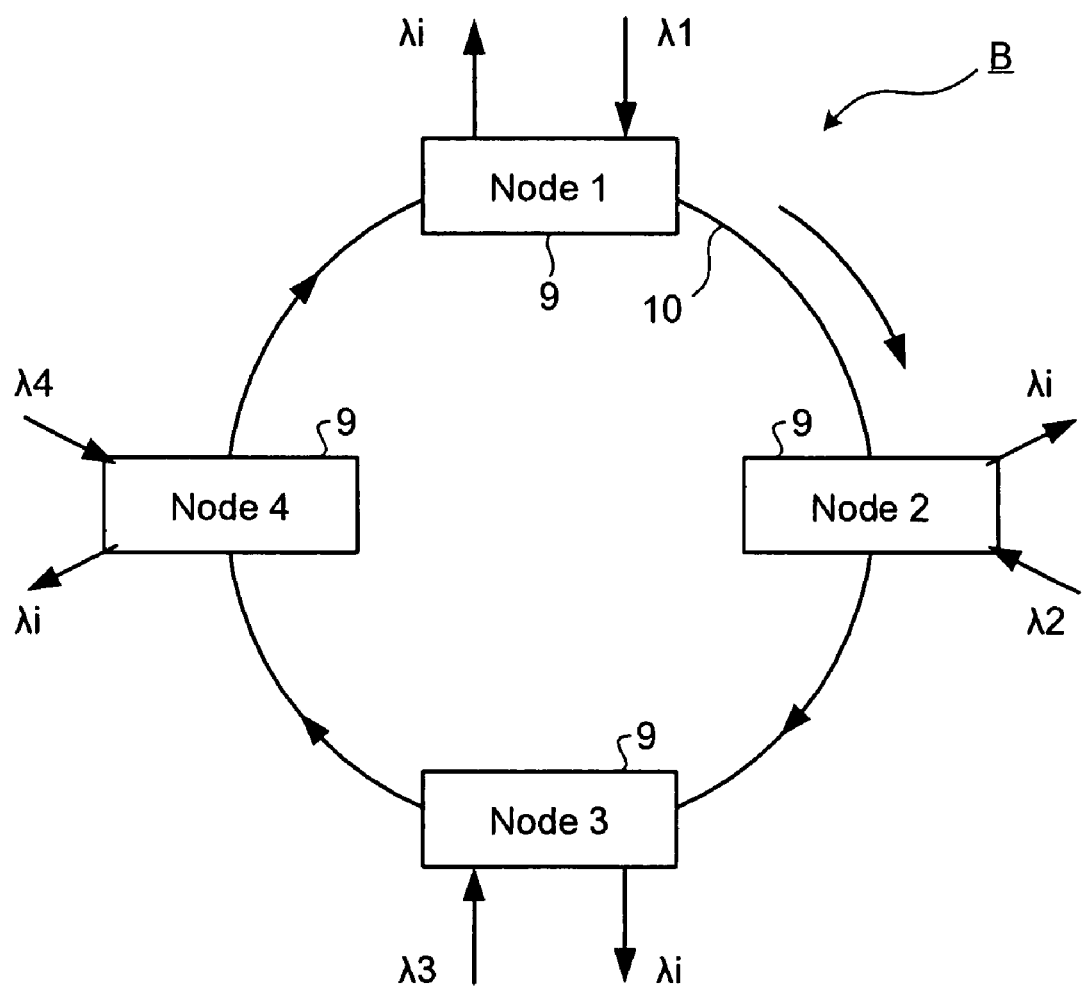
FIG. 9 depicts an optical ring network using a WDM.
Figure 10:
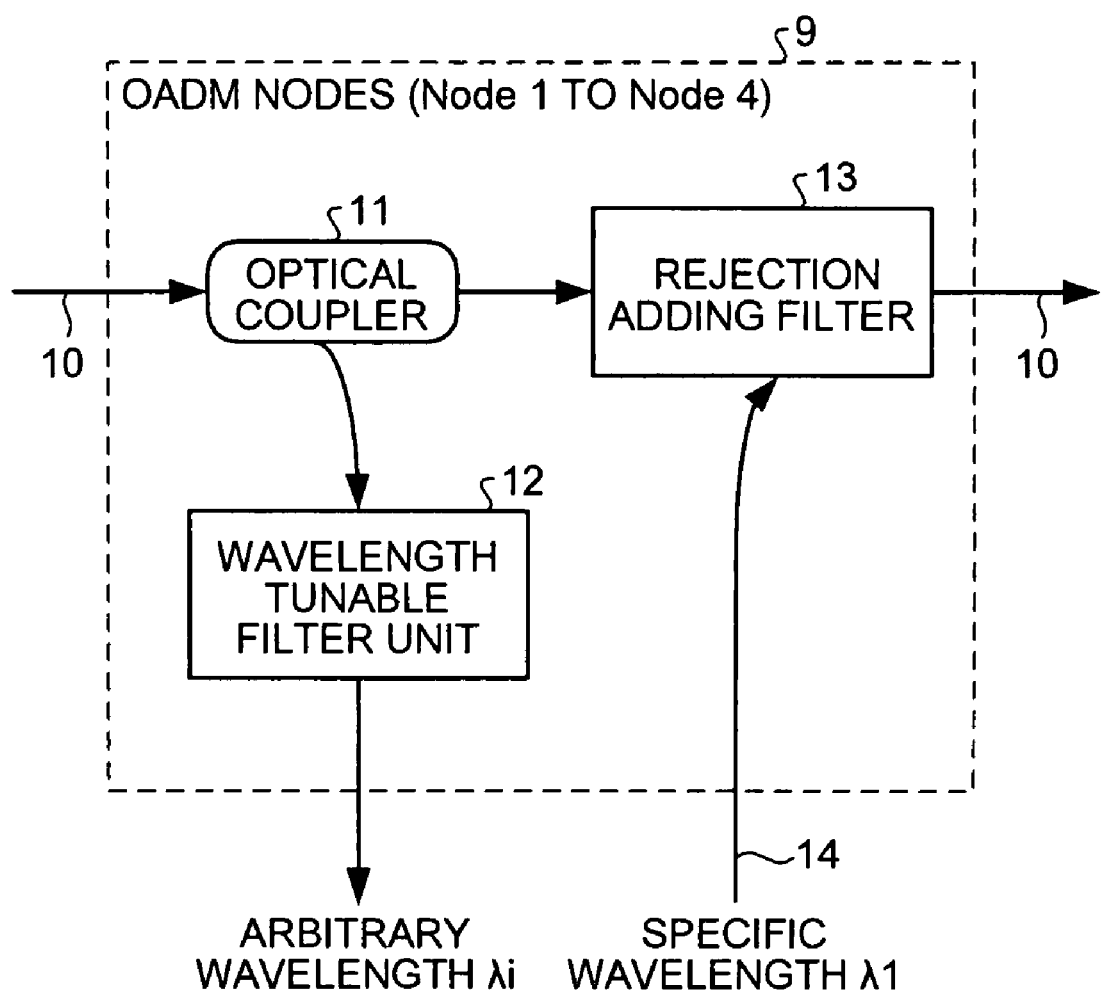
FIG. 10 depicts an OADM node disposed on the optical ring network.
Figures 11, 12:
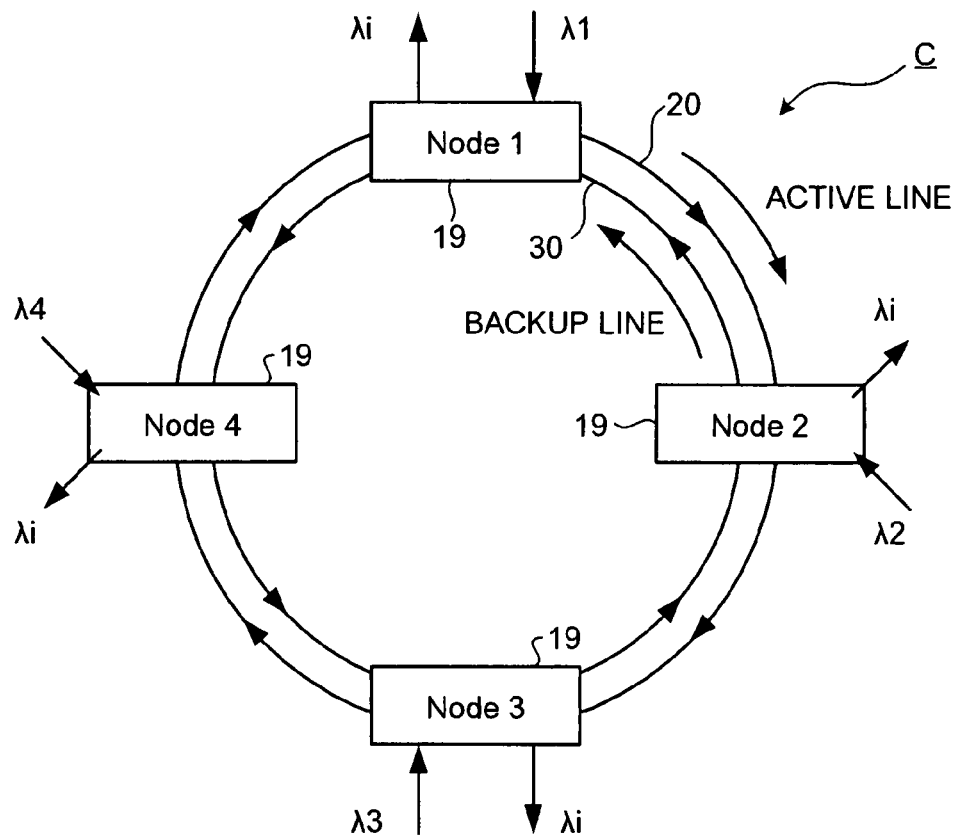
FIG. 11 depicts an optical ring network using two optical fibers.
FIG. 12 is a chart of multiplexed states of the WDM signal at each node in the network depicted in FIG. 11.
Figures 13, 14:
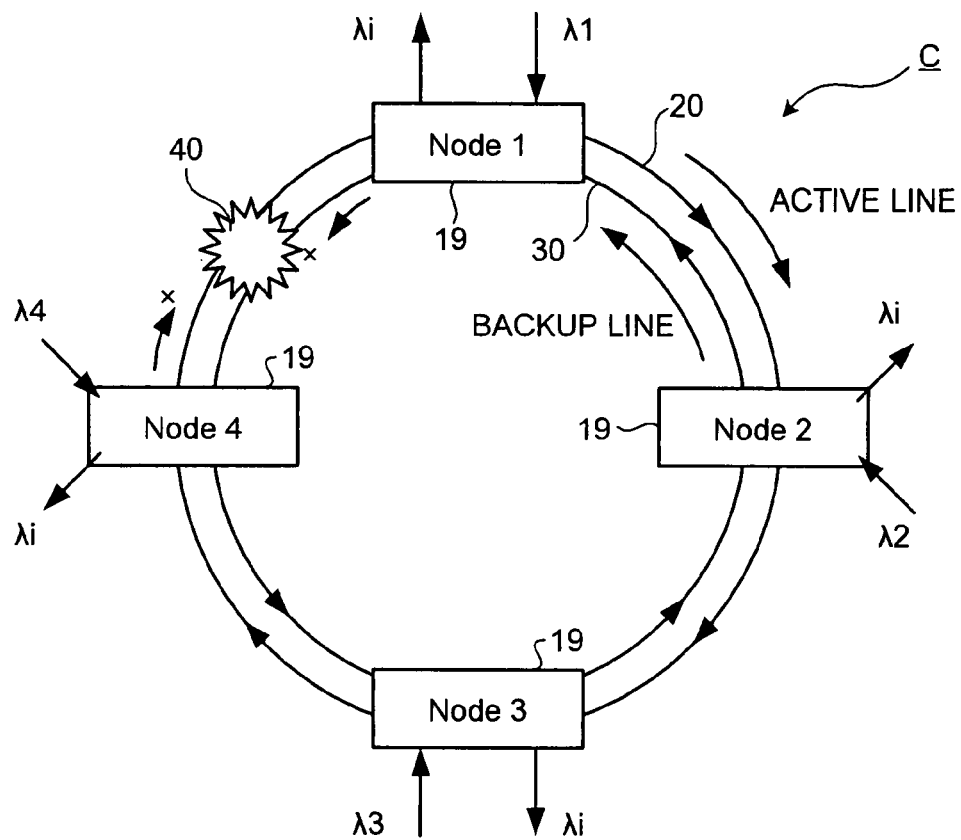
FIG. 13 depicts a simultaneous disconnection of both an active line and a backup line in an optical ring network that uses two optical fibers.
FIG. 14 is a chart of multiplexed states of the WDM signal at Node 1 to Node 4 in the network depicted in FIG. 13.

FIG. 8 is a flowchart of operations from disconnection detection on an optical fiber to operating wavelength information updating according to the second embodiment. Referring to FIG. 8, description will be given for operations for the setting of a new wavelength path executed when two optical fibers are simultaneously disconnected in the above optical ring network A including the OADM nodes 103 (see FIG. 7) and the network managing apparatus 102 (see FIG. 2).

The optical monitor 701 continuously monitors the optical intensity of the WDM signal and the monitoring information is transmitted to the node controlling unit 702. A significant decrease in the optical intensity or a state in which no WDM signal is detected can be a factor indicating a disconnection of an optical fiber. Therefore, to detect a disconnection of an optical fiber, the node controlling unit 702 first judges whether any disconnection of the WDM signal is detected (step S801). When no disconnection of the WDM signal is detected (step S801: NO), the node controlling unit 702 judges that the transmission of the WDM signal is executed normally, and assumes a standby state.

When a disconnection of the WDM signal is detected (step S801: YES), in the case of the OADM node 103 (Node 1) connected to the network managing apparatus 102, the OADM node 103 directly notifies the network managing apparatus 102 through the electric router 703 connected thereto by an alarm indicating the disconnection of the WDM signal. In the case of the OADM nodes 103 (Node 2 to Node 4) that are not connected to the network managing apparatus 102, the OADM nodes 103 each notify the network managing apparatus 102 of the alarm indicating the disconnection of the WDM signal by passing the alarm from the electric router 703 connected thereto on the active line 100 or the backup line 110 using the OSC through the electric router of Node 1 (step S802).

Having been notified by the alarm indicating the disconnection of the WDM signal, the network managing apparatus 102, according to the control of the controlling unit 202, refers to the operating wavelength table retained in the operating wavelength table unit 203 caused by (see FIG. 2) (step S803) and judges whether the detected disconnection of the WDM signal is caused by a disconnection of an optical fiber, or because the corresponding OADM node 103 has no operating wavelength and therefore, the WDM signal is not detected thereby causing the alarm.

The network managing apparatus 102 judges whether the corresponding OADM node 103 in the operating wavelength table retained has an operating wavelength (step S804). When the OADM node 103 has no operating wavelength (step S804: NO), the network managing apparatus 102 judges that no disconnection of any optical fiber is present. The operation returns to step S801 and the network managing apparatus 102 assumes the standby state.

When the OADM node 103 has an operating wavelength (step S804: YES), the network managing apparatus 102 judges that a disconnection of an optical fiber has occurred, and further judges whether the apparatus 102 has received alarms indicating a disconnection of the WDM signal respectively from multiple OADM nodes 103 (step S805). If the network managing apparatus 102 has not received alarms from multiple OADM nodes 103 (step S805: NO), the apparatus 102 judges that the two optical fibers have not been simultaneously disconnected. The operation returns to step S801 and the apparatus assumes the standby state.

If the network managing apparatus 102 has obtained alarms from multiple OADM nodes 103 (step S805: YES), the apparatus 102 judges whether the alarms received from two of the OADM nodes 103 indicate a disconnection of the WDM signal between the same OADM nodes 103 (step S806). When the alarms indicate disconnections of the WDM signal between the OADM nodes 103 that are different (step S806: NO), the apparatus 102 judges that the alarms do not indicate a disconnection of the WDM signal between the same OADM nodes 103. The operation returns to step S801 and the apparatus 102 assumes the standby state.

When the alarms from the two of the OADM nodes 103 indicate a disconnection of the WDM signal between the OADM nodes 103 that are same for the alarms (step S806: YES), the apparatus 102 judges that two optical fibers connecting the two OADM nodes 103 that issued the alarms are simultaneously disconnected, and identifies the disconnected positions of the optical fibers (step S807). The network managing apparatus 102 refers to the operating wavelength table (see FIG. 3) retained in the network managing apparatus 102 and updates the operating wavelength table based on information on the disconnected positions of the optical fibers identified at step S807 (step S808). The apparatus 102 distributes operating wavelength information from the operating wavelength table updated at step S808 to each of the OADM nodes 103 in the optical ring network using the OSC (step S809), thereby, ending the operating wavelength information updating operation.

Similar to the first embodiment, the operating wavelength information for each disconnected position of each of the optical fibers distributed to each of the OADM nodes 103 in the updating operation shown in FIG. 8 is based on the operating wavelength table 600 shown in FIG. 6.

As described above, according to the second embodiment, the WDM signal is monitored and the monitoring information for each of the OADM nodes 103 is centrally managed and the operating wavelength information updated corresponding to the disconnected positions of the optical fibers is distributed to each of the OADM nodes 103. Therefore, the re-setting of a specific wavelength for each of the OADM nodes 103 and a transmission path are enabled although two optical fibers remain disconnected.

According to the present embodiments, even a low cost OADM node having a simple configuration can cope with two optical fibers simultaneously disconnecting and enable the setting of a new wavelength and path.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A network managing apparatus connected to one of a plurality of nodes that execute optical communication on an optical ring network configured with two transmission paths including an active line and a backup line, the network managing apparatus comprising:
   a storing unit that stores arrangement information of the nodes and operating wavelength information of optical signals transmitted by the nodes; and
   a controlling unit that updates, based on fault information received from the nodes, the operating wavelength information and distributes the updated operating wavelength information to the nodes, wherein the controlling unit includes
   a determining unit that determines whether the fault information indicates a simultaneous disconnection that is a state in which both the active line and the backup line are disconnected between an identical pair of nodes among the nodes; and
   an identifying unit that identifies a position of the simultaneous disconnection depending on a result of determining by the determining unit and the arrangement information.

2. The network managing apparatus according to claim 1, wherein the fault information is a network monitoring signal that uses an optical monitoring channel.

3. The network managing apparatus according to claim 1, wherein the controlling unit includes
   a reading unit that reads, from the storing unit, the operating wavelength information of the nodes that have issued the fault information;
   a judging unit that judges whether the optical signals are being transmitted by the nodes that have issued the fault information, based on the read operating wavelength information;

a determining unit that determines whether the fault information indicates a simultaneous disconnection that is a state in which both the active line and the backup line are disconnected between an identical pair of nodes among the nodes; and an identifying unit that identifies a position of the simultaneous disconnection depending on a result of determining by the determining unit and the arrangement information.

4. The network managing apparatus according to claim 3, wherein the fault information is an alarm generated by the nodes based on determination of an optical signal disconnection.

5. A network managing method of managing an optical ring network configured by two optical transmission paths including an active line and a backup line, the network managing method comprising:

receiving fault information from a plurality of nodes on the optical ring network;

determining whether the fault information indicate a simultaneous disconnection that is a state in which both the active line and the backup line are disconnected between an identical pair of nodes among the nodes;

identifying a position of the simultaneous disconnection depending on the determining and the arrangement information;

updating, based on the received fault information, arrangement information of the nodes and operating wavelength information of optical signals being transmitted by the nodes; and distributing the updated operating wavelength information to the nodes.

6. The network managing method according to claim 5, further comprising:

reading the operating wavelength information of the nodes that have issued the fault information;

judging, based on the read operating wavelength information, whether an optical signal is being transmitted at the nodes;

determining whether the fault information indicate a simultaneous disconnection that is a state in which both the active line and the backup line are disconnected between an identical pair of nodes among the nodes; and identifying a position of the simultaneous disconnection depending on the determining and the arrangement information.

* * * * *